(12) United States Patent
Chakravarty et al.

(10) Patent No.: US 10,380,548 B2
(45) Date of Patent: Aug. 13, 2019

(54) EVENT-DRIVEN CUSTOMIZABLE AUTOMATED WORKFLOWS FOR INCIDENT REMEDIATION

(71) Applicant: Oracle International Corporation, Redwood Shores, CA (US)

(72) Inventors: Dipto Chakravarty, Potomac, MD (US); John Melvin Antony, Falls Church, VA (US); Usman Choudhary, Springfield, VA (US); David Capuano, Herndon, VA (US); Srinivasa Phanindra Mallapragada, Ashburn, VA (US)

(73) Assignee: Oracle International Corporation, Redwood Shores, CA (US)

( * ) Notice: Subject to any disclaimer, the term of this patent is extended or adjusted under 35 U.S.C. 154(b) by 191 days.

(21) Appl. No.: 15/619,998

(22) Filed: Jun. 12, 2017

(65) Prior Publication Data

US 2017/0278066 A1    Sep. 28, 2017

Related U.S. Application Data

(63) Continuation of application No. 11/643,773, filed on Dec. 22, 2006, now Pat. No. 9,715,675.

(60) Provisional application No. 60/836,657, filed on Aug. 10, 2006.

(51) Int. Cl.
  *G06Q 10/10*  (2012.01)
  *G06Q 10/06*  (2012.01)

(52) U.S. Cl.
  CPC .............. *G06Q 10/10* (2013.01); *G06Q 10/06* (2013.01); *G06Q 10/0633* (2013.01); *G06Q 10/06316* (2013.01); *G06Q 10/063114* (2013.01)

(58) Field of Classification Search
  CPC ........... G06Q 10/06; G06Q 10/063114; G06Q 10/06316; G06Q 10/0633; G06Q 10/10; Y04S 10/54
  USPC .................................................. 705/7.26, 27
  See application file for complete search history.

(56) References Cited

U.S. PATENT DOCUMENTS

| 5,630,069 A | 5/1997 | Flores et al. |
| 5,657,245 A | 8/1997 | Hecht et al. |
| 5,978,785 A | 11/1999 | Johnson et al. |
| 6,147,975 A | 11/2000 | Bowman-Amuah |
| 6,205,407 B1 | 3/2001 | Testa et al. |

(Continued)

OTHER PUBLICATIONS

Toll, C., "Helpdesk Solution Implementation Basics," Symantec Connect Community, Aug. 31, 2006, <https://www.symantec.com/connect/articles/helpdesk-solution-implementation-basics>.*

(Continued)

*Primary Examiner* — Renae Feacher
(74) *Attorney, Agent, or Firm* — Kilpatrick Townsend & Stockton LLP

(57) ABSTRACT

The invention relates to a system and method for customizing and storing workflow processes for use in remediation incidents such as security events. One aspect of the invention relates to providing tools to enable creation of customized workflow processes for event driven incident remediation, monitoring and analyzing system activity to identify occurrence of incidents, assigning a workflow process to an incident, applying the assigned workflow process to remediate the incident, and tracking and graphically displaying the status of the workflow process, among other things.

20 Claims, 8 Drawing Sheets

(56) References Cited

U.S. PATENT DOCUMENTS

| | | | |
|---|---|---|---|
| 6,208,720 B1 | 3/2001 | Curtis et al. | |
| 6,618,766 B1 | 9/2003 | Eshghi | |
| 6,766,368 B1 | 7/2004 | Jakobson et al. | |
| 6,779,120 B1 | 8/2004 | Valente et al. | |
| 6,792,456 B1 | 9/2004 | Hellerstein et al. | |
| 6,807,583 B2 | 10/2004 | Hrischuk et al. | |
| 6,839,850 B1 | 1/2005 | Campbell et al. | |
| 6,850,820 B2 | 2/2005 | Tajima | |
| 6,883,034 B1 | 4/2005 | Pelavin | |
| 6,886,102 B1* | 4/2005 | Lyle | G06F 21/554 709/206 |
| 6,983,221 B2 | 1/2006 | Tracy et al. | |
| 7,051,125 B1 | 5/2006 | Flott, Jr. et al. | |
| 7,065,493 B1 | 6/2006 | Homsi | |
| 7,269,625 B1 | 9/2007 | Willhide | |
| 7,302,674 B1 | 11/2007 | Gladieux et al. | |
| 7,324,108 B2 | 1/2008 | Hild et al. | |
| 7,379,999 B1 | 5/2008 | Zhou et al. | |
| 7,444,395 B2 | 10/2008 | Sanghvi et al. | |
| 7,457,872 B2 | 11/2008 | Aton et al. | |
| 7,509,677 B2 | 3/2009 | Saurabh et al. | |
| 7,565,643 B1 | 7/2009 | Sweet et al. | |
| 7,587,718 B1* | 9/2009 | Mincarelli | G06F 9/5011 709/224 |
| 7,624,396 B1 | 11/2009 | Isenberg | |
| 7,624,448 B2 | 11/2009 | Coffman | |
| 7,668,953 B1 | 2/2010 | Sinclair | |
| 7,673,335 B1 | 3/2010 | Chakravarty et al. | |
| 7,707,133 B2 | 4/2010 | Das et al. | |
| 7,716,739 B1 | 5/2010 | McCorkendale | |
| 7,899,935 B2 | 3/2011 | Zhu et al. | |
| 7,926,099 B1* | 4/2011 | Chakravarty | G06F 9/542 340/500 |
| 7,984,452 B2 | 7/2011 | Chakravarty et al. | |
| 2001/0051937 A1 | 12/2001 | Ross et al. | |
| 2002/0065855 A1 | 5/2002 | Meyers et al. | |
| 2002/0087220 A1 | 7/2002 | Tveit et al. | |
| 2002/0111755 A1 | 8/2002 | Valadarsky et al. | |
| 2002/0111824 A1 | 8/2002 | Grainger | |
| 2002/0133328 A1 | 9/2002 | Bowman-Amuah | |
| 2002/0138605 A1 | 9/2002 | Hole | |
| 2002/0165842 A1 | 11/2002 | Hellerstein et al. | |
| 2002/0170069 A1 | 11/2002 | Bialk et al. | |
| 2002/0173997 A1* | 11/2002 | Menard | G06Q 30/06 709/223 |
| 2003/0135378 A1 | 7/2003 | Carlson | |
| 2003/0172166 A1 | 9/2003 | Judge et al. | |
| 2004/0010709 A1 | 1/2004 | Baudoin et al. | |
| 2004/0015497 A1 | 1/2004 | Swarna et al. | |
| 2004/0138970 A1 | 7/2004 | Ramachandran et al. | |
| 2004/0139166 A1 | 7/2004 | Collison | |
| 2005/0005017 A1 | 1/2005 | Ptacek et al. | |
| 2005/0060562 A1 | 3/2005 | Bhattacharya et al. | |
| 2005/0086502 A1 | 4/2005 | Rayes et al. | |
| 2005/0131937 A1 | 6/2005 | Parkyn | |
| 2005/0160134 A1 | 7/2005 | Childress et al. | |
| 2005/0222811 A1 | 10/2005 | Jakobson et al. | |
| 2005/0262215 A1 | 11/2005 | Kirov et al. | |
| 2006/0015603 A1 | 1/2006 | Jakobsen et al. | |
| 2006/0036713 A1 | 2/2006 | Araujo et al. | |
| 2006/0074735 A1* | 4/2006 | Shukla | G06F 8/34 705/80 |
| 2006/0116913 A1 | 6/2006 | Hansan et al. | |
| 2006/0130070 A1 | 6/2006 | Graf | |
| 2006/0143034 A1* | 6/2006 | Rothermel | G06Q 10/10 705/301 |
| 2006/0224545 A1 | 10/2006 | Keith, Jr. | |
| 2007/0047439 A1 | 3/2007 | Lianjun et al. | |
| 2007/0150934 A1 | 6/2007 | Fiszman et al. | |
| 2007/0174693 A1* | 7/2007 | Gerber | G06F 11/0709 714/15 |
| 2007/0180490 A1 | 8/2007 | Renzi et al. | |
| 2007/0192853 A1 | 8/2007 | Shraim et al. | |
| 2007/0192862 A1 | 8/2007 | Vermeulen et al. | |
| 2007/0245357 A1 | 10/2007 | Breiter | |
| 2007/0266138 A1* | 11/2007 | Spire | G06F 11/0709 709/223 |
| 2008/0016502 A1 | 1/2008 | Henderson et al. | |
| 2008/0047009 A1 | 2/2008 | Overcash et al. | |
| 2008/0131937 A1 | 6/2008 | Schroeder | |
| 2008/0147610 A1 | 6/2008 | Mohanty | |
| 2008/0244741 A1 | 10/2008 | Gustafson et al. | |
| 2008/0270198 A1 | 10/2008 | Graves | |
| 2011/0173359 A1 | 7/2011 | Chakravarty et al. | |

OTHER PUBLICATIONS

Drew, Steven, "Reducing Enterprise Risk with Effective Threat Management," Information Security Management, Jan./Feb. 2005.*

"IBm Looks Within for Security Push," Microsoft Corporation, 2003.*

Chen etal., "Complex Event Processing Using Simple Rule-Based Event Correlation Engines for Business Performance Management", Proceedings of the 8th IEEE International Conference on E-Commerce Technology and the 3rd IEEE International Conference on Enterprise Computing, E-Commerce, and E-Services, CEC/EEE 2006, 8 pages.

Chapter 11 Identity Auditing, Oracle, Nov. 2006, <https://docs.oracle.com/cd/E19164-01 /820-0816/IDM_admin_id_auditing.html>.

"Vulnerability Management: Tools, Challenges and Best Practices," SANS Institute InfoSec Reading Room, 2003,< https :/ /www.sans.org/read ing-room/whitepapers/threats/vulnerability-management-tools-challenges-practices-1267 >.

Help-desk application debuts: Software uses OLE to help with windows, mac troubleshooting. (1994). Open Systems Today, 38. Retrieved from https ://dialog.proquest.com/professional/professional/docview/682065514?accountid= 142257.

Network vulnerability assessment management: Eight network scanning . . . Andress, Mandy Network World; Nov. 8, 2004; 21, 45; ProQuest p. 48.

U.S. Appl. No. 11/643,773, filed Dec. 22, 2017 Non Final Office Action dated Nov. 26, 2012, 23 pages.

U.S. Appl. No. 11/643,773, filed Dec. 22, 2017 Final Office Action dated Apr. 1, 2012, 24 pages.

U.S. Appl. No. 11/643,773, filed Dec. 22, 2017 Non Final Office Action dated Sep. 12, 2013, 27 pages.

U.S. Appl. No. 11/643,773, filed Dec. 22, 2017 Final Office Action dated Mar. 17, 2014, 28 pages.

U.S. Appl. No. 11/643,773, filed Dec. 22, 2017 Non Final Office Action dated Oct. 9, 2014, 30 pages.

U.S. Appl. No. 11/643,773, filed Dec. 22, 2017 Final Office Action dated May 2015, 31 pages.

U.S. Appl. No. 11/643,773, filed Dec. 22, 2017 Non Final Office Action dated Jan. 14, 2016, 30 pages.

U.S. Appl. No. 11/643,773, filed Dec. 22, 2017 Final Office Action dated Aug. 8, 2016, 33 pages.

U.S. Appl. No. 11/643,773, filed Dec. 22, 2017 Notice of Allowance dated Mar. 9, 2017, 20 pages.

* cited by examiner

EVENT-DRIVEN CUSTOMIZABLE AUTOMATED WORKFLOWS FOR INCIDENT REMEDIATION

CROSS-REFERENCES TO RELATED APPLICATIONS

The present application is a continuation of U.S. patent application Ser. No. 11/643,773, filed Dec. 22, 2006, entitled "EVENT-DRIVEN CUSTOMIZABLE AUTOMATED WORKFLOWS FOR INCIDENT REMEDIATION," which claims priority from U.S. Provisional Patent Application No. 60/836,657, filed Aug. 10, 2006, and entitled "CUSTOMIZABLE AUTOMATED WORKFLOWS FOR INCIDENT REMEDIATION," the entire contents of which are incorporated herein by reference for all purposes.

FIELD

The invention relates to customizable automated workflows for event driven incident remediation, which can be created and viewed via a graphical user interface.

BACKGROUND

Systems that detect network incidents (e.g. for threats and vulnerabilities), in general, are known. Systems for creating an incident ticket and tracking resolution of incidents, in general, are known. These systems, however, suffer from various drawbacks. Among other drawbacks, at least some of these systems suffer from the requirement for excessive manual intervention, inefficient incident routing and ineffective management of over all incident response. Conventional workflow processes, in general, are known. These workflows often have limited flexibility and are often predefined and not easily customized by a user. Current systems also fail to provide an automated approach for linking methods related to identifying, monitoring and resolving event driven network issues and incidents relating to corporate governance and compliancy. Other drawbacks with known technologies exist.

SUMMARY

One aspect of the invention relates to customizing and storing workflow processes for use in remediating incidents such as security events. One aspect of the invention relates to providing tools to enable creation of customized workflow processes for event driven incident remediation, monitoring and analyzing system activity to identify occurrence of incidents, assigning a workflow process to an incident, applying the assigned workflow process to remediate the incident, and tracking and graphically displaying the status of the workflow process, among other things.

In one or more embodiments, a system may include a correlation analysis engine, an incident tracking module, an assignment module, a workflow module, and a graphical user interface. The correlation analysis engine (or other mechanism) may be used to monitor and/or analyze network events to determine the occurrence of incidents. Broadly network events may relate to security threats, compliance breaches and/or other events. Network events may include policy events (e.g., events based on policy violation), compliance events (e.g., events based on compliance breach) and/or other events. One or more network events may be identified as an incident. Incidents (including event characteristics) may be reported to an incident tracking module.

The incident tracking module may create an incident object. An assignment module may facilitate the assignment of a workflow process instance to an incident. A workflow module may be used to create, edit and run workflow instances. The workflow module includes, at least, an edit mode for creating and/or editing workflow instances and a remediation mode for remediating incident objects. The graphical user interface can be used to display information from the incident tracking module and/or workflow module.

The workflow module may be used in an edit mode to create a set of customizable workflow process instances. Different workflow process instances may be created to be selectively used to remediate different types of incidents. Types of workflows may include, but are not limited to, policy workflows, compliance workflows and/or corporate governance workflows. A workflow process instance may be created, modified, stored, and/or deleted. Each workflow process instance may include a series of steps, each of which may include one or more work-items (manual and/or automatic) and transitions between the steps and/or work-items.

An incident identified by the correlation engine (or other mechanism) may be sent to the incident tracking module. The incident tracking module may be used to create incident objects and track the status of incident remediation. In addition to tracking individual incident objects, the incident tracking module may maintain a list of all pending and past incident objects including information on resources assigned to each incident object, incident resolution status, and/or other information.

An assignment module may be used to select and assign a workflow process instance to a detected incident. The assignment of a workflow process instance to an incident may be made according to workflow assignment rules. For example, a particular workflow process instance may be designed to remediate a particular type of incident, e.g., depending on details of the particular incident. Alternatively or in addition, the workflow process instance may be manually assigned to the incident. In either implementation the incident object may be modified to include information about the assigned workflow process instance.

In remediation mode, the workflow module executes the assigned workflow process instance(s) in an attempt to remediate the designated incident. Execution of the workflow process instance may include implementing the steps of the workflow (including one or more work-items in each step), and depending on the status or outcome of a step and/or work-items, transitioning the process (or part of the process) to one or more other steps/work-items or triggering another incident (as specified when the workflow instance was created). In some steps, multiple work-items may be performed in parallel. The remediation mode also allows the status of the remediation of each incident object to be tracked (e.g., via incident tracking module) as execution of the assigned workflow process instance is used to remediate the incident. This includes granular tracking of the status of the execution of the steps/work-items in the workflow instance (e.g., which steps/work-items have been completed and/or success, failure or other information regarding each step/work-item).

The user interface may be used to display a graphical representation associated with the incident tracking module and/or workflow module. In the workflow module edit mode, the user interface may be used to create a new workflow process instance and/or edit existing workflow process instances (e.g., by using graphical objects and/or other object oriented tools). Regarding the incident tracking module, the user interface may display an organized list of pending and/or resolved incident objects and information associated therewith. For a selected incident object, the user interface may graphically display the selected workflow process instance (e.g., including the steps, with their associated work-item(s), and transitions in the selected workflow process instance between steps) and the execution status of the process (e.g., with respect to the graphically displayed steps and/or work-items). For example, a status indicator may be graphically displayed on or in association with one or more steps to graphically show its status. The integration of these features in a single system, exposed through a common graphical user interface enables an administrator or other user to visually monitor current incident information (e.g. the precise status of pending incident object remediation and historical information (e.g. resolved incident objects and information related thereto including aggregate information)).

Creating a customized workflow may include using a workflow module in edit mode to define a workflow process instance. The workflow process instance may include a set of work-items to be performed and transitions between the steps. Each step may include one or more work-items. A work-item may be a logical, self contained unit of work within the process. A work-item may represent work which will be processed either automatically (e.g., via one or more computer applications) and/or manually (e.g., by one or more people).

A user may create and edit a workflow process from scratch or by starting with a template. For example, the use may create or edit a workflow instance by using drag and drop features of the graphical user interface to place one or more steps/work-items and transitions there between into a sequence. Various types of work-items may be used, including manual work-items and automatic work-items. Automatic work-items (also called system work-items) may include template work-items, command work-items, notification work-items, decision work-items and/or other types of automatic work-items.

The work-items and transitions may each possess a set of attributes. Attributes associated with work-items and transitions within a workflow process instance may be easily specified and/or modified by the user. The work-item attributes may depend on work item type and can include at least name, icon, and process variables, among other things. Manual work-items (or a portion of a work-item), which require user input, may be assigned to a human resource. The human resource may be one or more specific individuals or it may be a role. As used here, a role refers to a class or group of people based on one or more characteristics (e.g., a title, position, authorization level, qualifications, etc.).

Transition attributes may include name, icon, description, transition criteria and/or other attributes. The transition criteria may include information for determining when to transition between steps and/or work-items and to which step or work-item to transition into. Information regarding, for example, a source work-item and destination work-item to transition from and to, respectively, may depend on the outcome and/or status of the source work-item and/or other factors. For example, a system work item can be configured to perform an action that may be implemented on a source network device (or downstream device) that caused an incident. Completion of the system work-item may depend on results from the action(s) taken. If the action is not successfully completed (e.g., error in performing the action) then another incident (sub-incident) may be triggered in order to solve the problem before moving on to the next work-item.

In some instances, a specific human resource or role (as described above) may be assigned an incident object based on characteristics of the incident and on characteristics of the human resource. In some instances a human resource or role may be assigned one or more manual steps and/or work-items within a workflow process. If the system assigns a work-item (or portion of a work-item) to a role, it may be subsequently selected by or assigned to an individual within that role. Prior involvement with an incident type or incident object may be taken into account in such assignments. In any event, upon assignment, a notification may be sent to the individual and/or role in order for the assigned incident object(s), step(s) and/or work-item(s) to be acted on by the human resource to which it (they) are assigned.

In operation, when an incident is detected (e.g., by a correlation analysis engine or otherwise) and reported to the incident tracking module, the assignment module may automatically select and assign, based on one or more workflow assignment rules, a workflow process instance to remediate the incident. The selected workflow process instance may then be implemented in an attempt to remediate the identified incident. Incident objects may be created to manage and track the status of incident remediation. One or more human resources may be assigned one or more incident objects in order to monitor the remediation of an incident. The same resource and/or different resources may be assigned to execute one or more work-items within the workflow process instance of the incident object. The progress/status of the assigned workflow process instance may be tracked and status information displayed via the user interface. The status information may be overlaid on and/or otherwise displayed as a graphical depiction in association with the workflow process instance itself. As the workflow process instance progresses along the sequence of steps and their associated work items and transitions between steps and/or work-items, the display may be updated to reflect the current progress in association with the display of the workflow process instance components. This provides significantly more information than just a "pending" or "resolved" status. Additionally, if delays or other issues arise in the workflow process, they may be easily observed, to enable manual intervention to occur, if desired. Among other things, the invention enables actionable intelligence to facilitate at least partially automated incident response.

DETAILED DESCRIPTION

Figure 1:
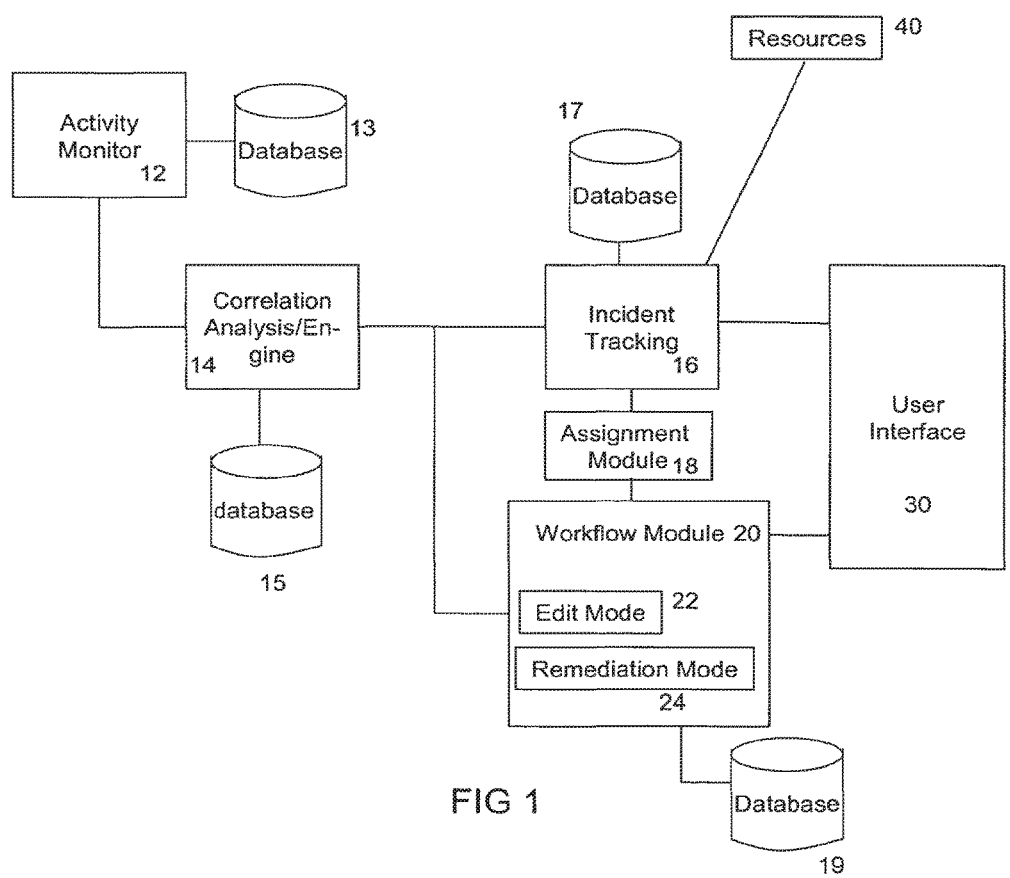
FIG. 1 relates to a high-level architecture of the system, according to an embodiment of the invention.

In one or more embodiments, a system may include a correlation analysis engine 14, an incident tracking module 16, an assignment module 18, a workflow module 20, a graphical user interface 30, and/or other components. These and other components may form a system architecture for performing various operations related to the functions of the inventions. The elements of FIG. 1 may be interconnected using commonly known communication techniques within a computer network architecture including intranet, local area network, distributed network, and wide area network, among others.

In some embodiments, correlation analysis engine 14 (and/or some other mechanism(s)) may be used to monitor and/or analyze network events to determine the occurrence of incidents. Aspects of the correlation analysis engine are described in more detail below. Network events may broadly refer to policy events, compliance events, and/or other types of events. A policy event may be an event based on a policy violation on the network. A compliance event may be based on a compliance breach. All events, collectively referred to as network events, may be analyzed to determine occurrence of an incident. Incidents (including event characteristics) may be reported to an incident tracking module 16. Incident tracking module 16 may create an incident object for each reported incident. Assignment module 18 may facilitate the assignment of one or more workflow process instance to a given incident. Workflow module 20 may be used to create, edit and run workflow process instances. Workflow module 20 may include, at least, an edit mode 22 for creating and/or editing workflow instances and a remediation mode 24 for remediating incident objects. Graphical user interface 30 can be used to display information from incident tracking module 16 and/or workflow module 20. Each module may be implemented on one or more network devices and/or combined in various ways on one or more network devices. One or more of the separately identified modules may be combined into a common module. The functions described as being within one module may be separated into two or more separate modules.

Workflow module 20 may be used in edit mode 22 to create or modify a set of customizable workflow process instances. Different workflow process instances may be created to be selectively used to remediate different types of incidents. The kinds of workflow processes may include, but are not limited to, compliance workflow, policy workflow, corporate governance workflow, and/or other types of workflows. As discussed further below, workflow process instances may be created, modified, stored, deleted and/or otherwise managed. Each workflow process instance may include a series of steps made up of one or more work-items (manual and/or automatic) and transitions between the steps and/or work-items. In one embodiment, a database 19 may be associated with workflow module 20 to facilitate storage of the workflow process instances. Additionally or instead, the workflow process instances may be stored in one or more other databases associated with the system.

Referring to FIG. 1, the system may include an activity monitor 12. Activity monitor 12 may collect events in real-time from security devices, network devices, security software and other devices and applications running on a network. If an event of interest occurs, for example, policy event, compliance event and/or other event, it may be passed along to the correlation engine 14, which may receive the event and proceed to determine whether to create an incident (e.g., based on correlation rules). An incident may be a predefined occurrence of a series of one or more events having one or more characteristics. For example, a series of events may show the characteristics of an intrusion attempting to access a secure asset which may be a violation of a predetermined policy (e.g., based on corporate governance). If an incident is created, it may comprise incident details including one or more of the events associated with the incident, a list of assets (e.g., devices) associated with the incident, vulnerabilities associated with the incident (e.g., affected devices), attack information, incident history and/or other incident related details. In some implementations, information about an incident and/or its characteristics may be routed from activity monitor 12 and/or the correlation engine 14 to incident tracking module 16 to begin remediation.

An incident identified by the correlation engine 14 (and/or other mechanism(s)) may be sent to the incident tracking module 16. Incident tracking module 16 may be used to create incident objects and track the status of remediation for the incident objects. Assignment module 18 may be used to select and assign a workflow process instance to the incident. (e.g., a customized workflow process instance designed in the manner described above). One or more reported incidents may be automatically (or manually) assigned a workflow processes instance based on incident details, workflow assignment rules and/or other information. For example, a particular workflow process instance may be designed to remediate a particular type of incident. By way of example, an incident based on a compliance event may be assigned a compliance workflow. The assigned workflow process instance enables incident remediation to begin.

In some implementations, an incoming incident may be associated with a customized workflow process instance by manual association. An authorized user may manually associate an incident to a stored workflow process instance. In either manual and/or automatic assignment, a workflow process instance is assigned to an incident and together these elements (workflow process instance and incident details) may form at least a portion of an incident object associated with the incident. The incident object may include additional information (e.g., as attachments) such as information about assets that are being attacked (e.g., devices), the vulnerabilities of these assets, and/or other information about the attack that may be retrieved from a correlation engine database. The incident object enables incidents to be managed as self contained objects. For example, the incident object may be, emailed, modified, viewed, and/or deleted, among other things. The incident tracking module 16, in coordination with workflow module 20, enables the overall number of incident objects to be monitored and managed. Once an incident object has been created, the overall remediation process in accordance to the created and selected workflow process instance may be monitored by an assigned human resource for high-level monitoring.

In remediation mode 24, workflow module 20 executes one or more workflow process instances in an attempt to remediate a designated incident. Workflow process instances for each incident object may be assigned by assignment module 18. Execution of the workflow process instance may include implementing one or more steps of the workflow process, each of which may be made up of one or more work-items. Depending on the status or outcome of a given step or work-item the workflow transitions the process (or part of the process) to one or more other steps, work-items, or can trigger another incident (as specified when the workflow instance was created). In some steps, multiple work-items may be performed in parallel. Work-items and/or steps within a workflow process instance may be manually and/or automatically executed. Manual work-items may require manual response from an assigned human resource (e.g., user/role) in order to be completed. The human resource assignment for one or more manual work-items may be specified when the workflow process instance is initially designed in the manner described above. A human resource may be a user, system administrator and/or analyst, among others things. The human resource may be delegated a work item based on their role (e.g., system administrator, analyst, etc.) and/or identity (e.g., user identifier, name, etc.). A notification may be sent to a human resource (e.g., user/role) in order to notify the human resource that a manual work-item(s) associated with an incident has been assigned to them. The notification may be graphically displayed in a work-list associated with a single user or group of users having one or more of the same roles.

In the case where a manual work-item is assigned to a group of users belonging to the same role, one user may assume responsibility for the work-item by being the first to select it from the group's work-list. The accepting user may become the owner of the work-item. The work-item may be transferred from the group's work-list to the user's personal work-list. A later manual work-item occurring within the same (or different) workflow process instance may be automatically assigned to the owner of one or more previous work-items. This allows a user familiar with the incident object to continue work on the same incident object. Other information may also be taken into account in the assignment such as that user's availability etc. These decisions may be made dynamically by the workflow module and/or tracking module as the workflow process instance is executed.

Another type of work-item relates to automatic work-items, also referred to as a system work-item. A system work-item may be automatically executed without user intervention via one or more computer applications. The workflow module (or other module) may initiate one or more actions associated with the system work-item. Various types of actions may be taken and certain actions may be implemented on a network device in an attempt to resolve at least a portion of the incident. For example, the action may attempt to reach back to an external source (or a downstream device) of the event(s) which caused the incident. Completion of a system work-item may depend on the results of the action(s) taken. For example, the system work-item may wait until the action is successfully completed (e.g., problem server is turned off) in order to move on to the next work-item. If the action is not successfully completed (e.g., error in shutting off problem server), then another incident (sub-incident) may be triggered in order to resolve the problem before moving on to the next work-item in the workflow process instance. For a sub-incident the same process described above may be used to assign a workflow process instance. Remediation of the sub-incident may be used to enrich the source workflow process instance. Therefore, one or more workflow process instances may depend on resolution of one or more sub-incidents.

As the remediation mode processes the incident according to the assigned workflow process instance the workflow module and the incident tracking module may receive updates based on completed workflow activities (e.g., work-items). The updated information enables remediation to be monitored, tracked and recorded for use with the workflow process instance and the incident object. Updates may be used to track and display progress of one or more workflow process instances executing on the system. In addition to tracking remediation for individual incident objects, the tracking module may maintain an updated list of all pending and past incident objects including information on incident resolution status, resources assigned to each incident object, and/or other information.

A user interface may be used to display a graphical representation associated with the remediation status, among other things. The workflow module, in conjunction with incident tracking module 16, enables status of individual incident objects to be tracked, including the status of individual steps/work-items within a workflow process instance. For example, incident tracking module 16 may display an organized record of all pending and past incident objects including information on human resources assigned to each incident object, incident resolution status, and/or other information.

For a selected incident object the incident tracking module 16 may provide a visual representation of the workflow progress in real-time using the assigned workflow process instance created in the workflow module edit mode. Incident object status information may be displayed via user interface 30. By way of example, user interface 30 may display a status indicator 602 on or in association with the graphical display (see, e.g., FIG. 2) of the workflow process instance. The status indicator may be updated to reflect changes in progress as updates are received for completion of work-items. The workflow process instance for the incident object may be executed until completion (e.g., end of the workflow process instance). Completion may indicate that the incident has been resolved. Resolved incident objects may be stored for future analysis. In one embodiment, incident objects may be stored in a database 17 associated with incident tracking module 16.

Figure 2:
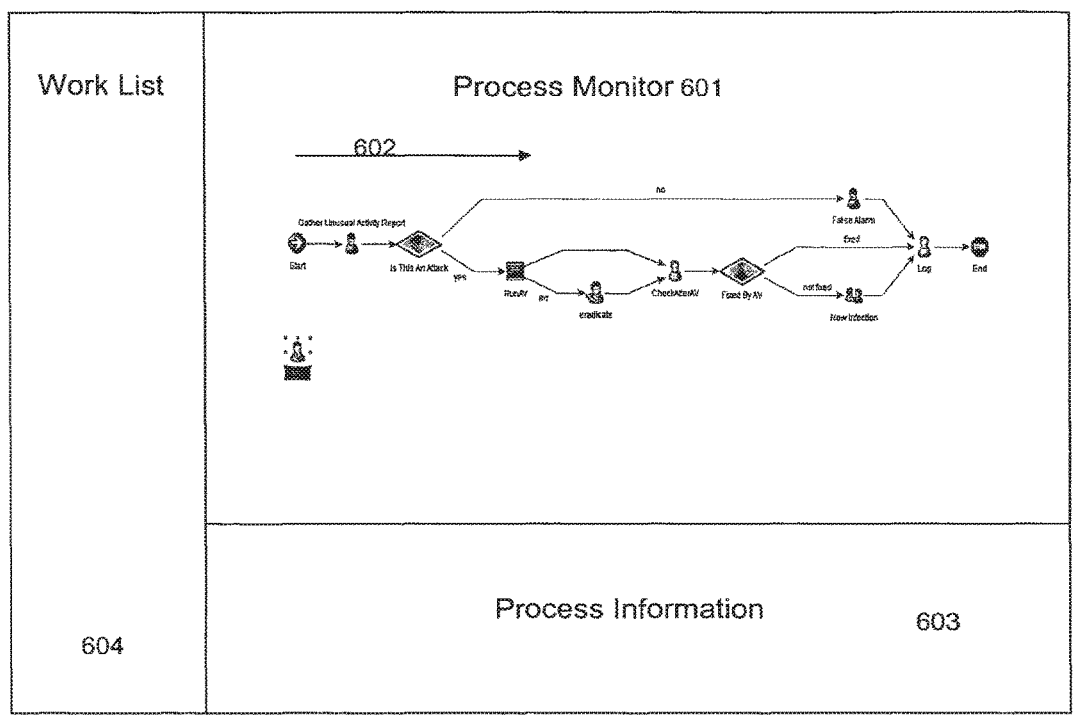
FIG. 2 is an exemplary screen view of process tracking, according to an embodiment of the invention.

FIG. 2 illustrates a remediation tracking user-interface including panels for process monitor 601, process information 603, and work-list handler 604. The user interface may be customized to include additional panels, alternative panels, toolbars and menu bars in different arrangements to that illustrated in the figure.

Process monitor 601 allows the user track progress of an instantiated workflow process instance. A real-time visual indicator 602 may be placed on, along, or in association with the workflow process graph in order to display the current process status. Process information 603 may display the information regarding the work-items and transitions in tabular form. The work list handler displays work-items to which a user and/or role is assigned. A work-item may be selected from the work-list. The status of the selected work-item may be displayed within the process monitor 601.

Pending incident objects and resolved incident objects may be organized by incident tracking module 16 in lists that include pending status and incident resolution status, among other information. A pending incident object may be an un-resolved incident that has been assigned a workflow process instance and is currently undergoing remediation according to the workflow process instance. Incident tracking module 16 may provide a high-level status of the completion. For example, a percentage (or other kind of measurement) may be displayed next to a pending incident object in a list of pending incident objects. This allows an administrative user and/or assigned user/role to observe overall status of one more incidents currently begin remediated.

Additionally, a list of resolved incidents may be stored. For example, the list of resolved incidents may be stored in database 17 and/or some other resource 40 associated with incident tracking module 16. Resolved incident objects are those that have completed the workflow remediation process according to a workflow process instance and have been resolved of any issues. Resolved incident objects may provide audit trail information of work-items and actions taken. Logging resolved incident data may be used by workflow module 20 for use in future workflow process analysis, among other things.

In addition to tracking incident objects the user interface 30 in combination with the workflow module 20 may be used to create workflows in an edit mode. As described above, the workflow module may include an edit mode 22 which enables a user to create, edit, modify, store, delete and otherwise manage workflow process instances. A workflow process instance may be represented in a graph or chart format (see FIG. 2) and comprise (i) a series of steps made up of one or more work-items and (ii) transitions between steps and/or work-items. A transition may indicate one or more alternative next steps and/or work-items to be taken, depending on the status/outcome of a prior step/work-item. Edit mode 22 enables the user to configure each step and/or work-item within user interface 30 as the user creates a customized workflow process instance.

Figure 3:
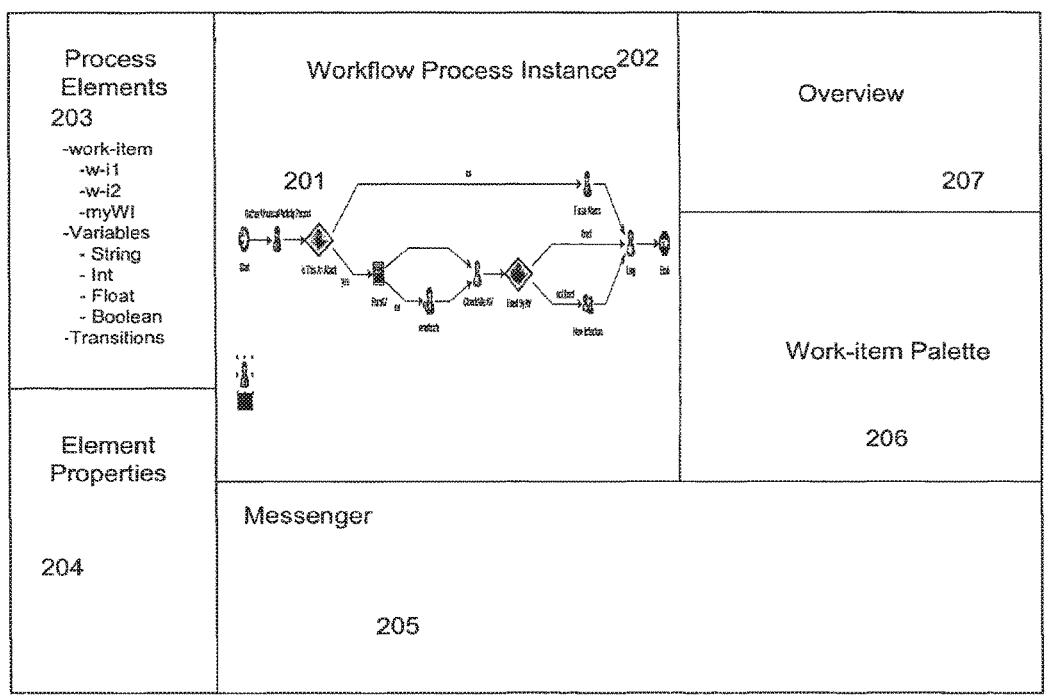
FIG. 3 is an exemplary screen view of a workflow editor, according to an embodiment of the invention.

FIG. 3 is an exemplary illustration of an edit mode user interface. The user interface may include several panels within a window that display various create/edit functionalities. FIG. 3 illustrates a window having a panel for the workflow process instance 202, process elements 203, element properties 204, message panel 205, work-item palette 206, and overview panel 207. The user interface may be customized to include additional panels, alternative panels, toolbars and menu bars in different arrangements from that illustrated in FIG. 3.

The panel for workflow process instance 202 enables the user to create/edit a workflow process instance using drag and drop elements from the work-item palette 206 in order to build a graph 201 that represents a desired workflow process. The workflow process instance is created, edited and displayed in the process graph panel 202. The user can select and place on the graph steps, work-item elements and transitions elements. A user can select a step, work-item or transition to add/modify attributes for the selected object. To facilitate this, the user interface may include a configuration dialogue with options relating to corresponding attributes. Work-items that have not been configured may be displayed with a visual indicator (e.g., a red background label and/or an error message may be displayed in panel 205). A given step and/or work-items may be removed from the graph (e.g., by selecting and deleting or dragging off the graph or otherwise). A confirmation dialog may be displayed and all transitions originating from the removed step will be deleted as well. Transitions may be added (e.g., by right clicking on steps or work-items and selecting an option to add transitions from a popup menu). A transition configuration dialog may be displayed to the user. The type of transition may be selected in the transition configuration window or the transition may be edited using the panel for element properties 204 (further described below). Transitions may be removed in a similar manner to the way steps are removed.

The panel for process elements 203 displays all the elements including step/work-item elements, transitions elements, and variable elements in a tree view. This allows the user to view all supported elements and custom elements (e.g., myWork-items) in an organized tree view. Objects from this panel may be dragged and dropped into the graph or otherwise incorporated therein.

The panel for element properties 204 may be a quick edit window that displays properties of a selected workflow element from the process graph 201. A user may select an element from graph 201 (e.g., by clicking on a desired element or selecting an element from the tree view in the process elements panel 203 or otherwise). After an element is selected the element properties may be displayed and modified from panel 204. Panel 204 may provide a property sheet which displays attributes of the selected process element(s). The user may populate or edit the element's attributes from the property sheet. In addition, a configuration dialog may be used for the same purpose.

The edit mode may automatically check for errors within a process graph. Message panel 205 may display error messages for errors in the process graph. For example, if the graph currently being created depicts a process that cannot be implemented, then an error message may be displayed in panel 205 to notify the user there is an error in the graph and perhaps the reason for the workflow process error. Panel 205 may also be used to provide other types of messages.

Work-item palette panel 206 lists all the work-item types supported by the system including custom created work-items. The list of work-items may be displayed in icon format or text format. Either format allows the user to drag and drop a selected work-item from work-item palette panel 206 into process panel 202.

Overview panel 207 displays a scaled down version of the complete graph at all times. For example, in certain instances, the user may create a graph that extends in either direction beyond the display provided in the process graph panel 202. Thus, the overview panel 207 allows the user to easily view the entire graph while focusing on a certain part of it in process graph panel 202.

According to another aspect of the invention, individual steps, work-items, and transitions are customizable to the user's specifications or organization's requirements. Templates can be created to facilitate creation and editing of workflow elements.

For example, in one embodiment, a user is enabled to configure work-item properties (attributes) using work-item dialog or a properties sheet in element properties panel 204. The dialog (or property sheet) allows the user to set various attributes of a work-item. The attributes to be configured may depend on the work-item type. Work-item name may be a minimum required attribute. The work-item dialog allows user to select an icon for the work-item, set the work-item name, and add a description for the work-item, among other things.

The system may support various different types of work-items. For example, in one embodiment, the system may support at least 5 types of work-items including a manual work-item, a template work-item, a command work-item, an alert work-item, and a decision work-item. At least these five work-items may be configured differently. Manual work-items are used to assign work-items to users or roles and associate process variables to display and get data from users. Manual work-items require some action to be taken by a user. The types of work-items (template work-item, command work-item, alert work-item, and decision work-item) may be automatically executed to perform a specified action via one or more computer applications.

Figure 4:
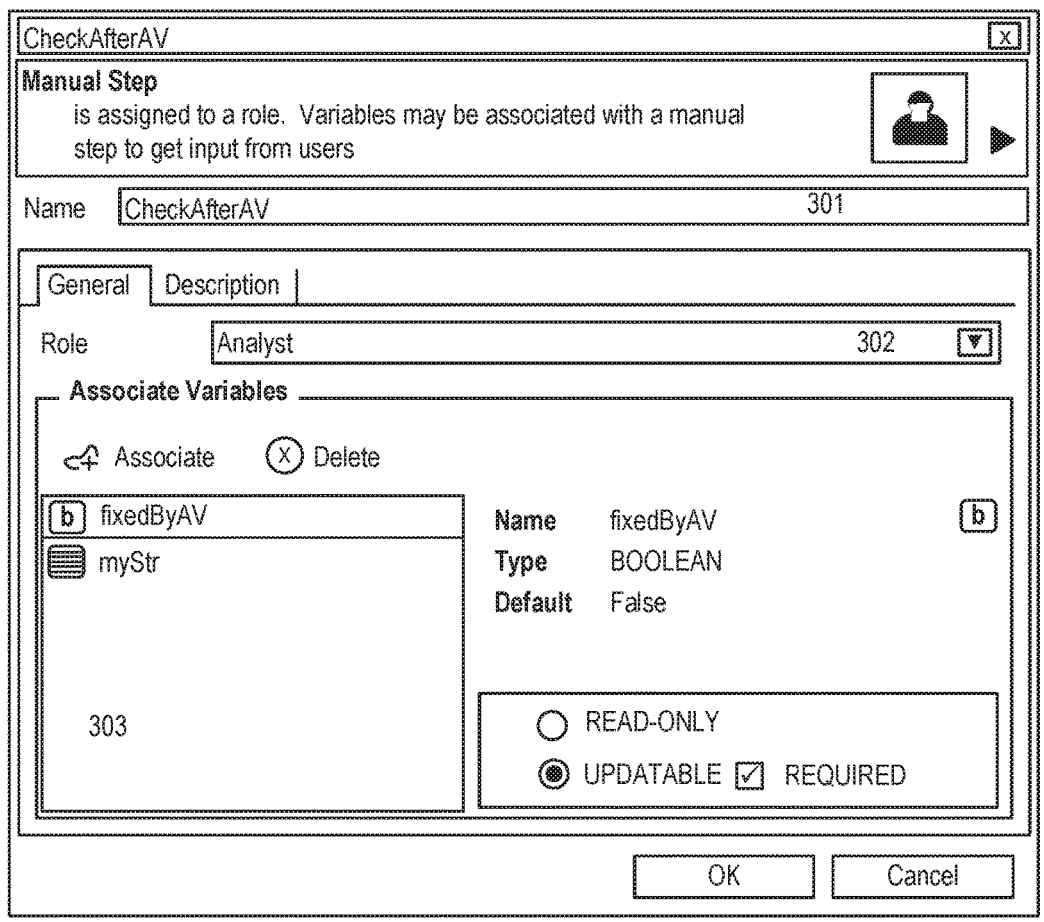
FIG. 4 is a manual work-item configuration dialog box, according to an embodiment of the invention.

FIG. 4 illustrates a configuration dialog for configuring a manual work-item. The dialog provides a list of roles in a drop down menu 302 to assign the work-item. A name may be entered within a text box 301. The associated variables may be listed within a window 303. The dialog may allow the user to add and delete variables in an updatable mode. If two or more manual work-items are defined within a workflow process instance, any later manual work-item may be configured to associate the same user that performed the first manual work-item. This allows a familiar user to continue the workflow process.

Figure 5:
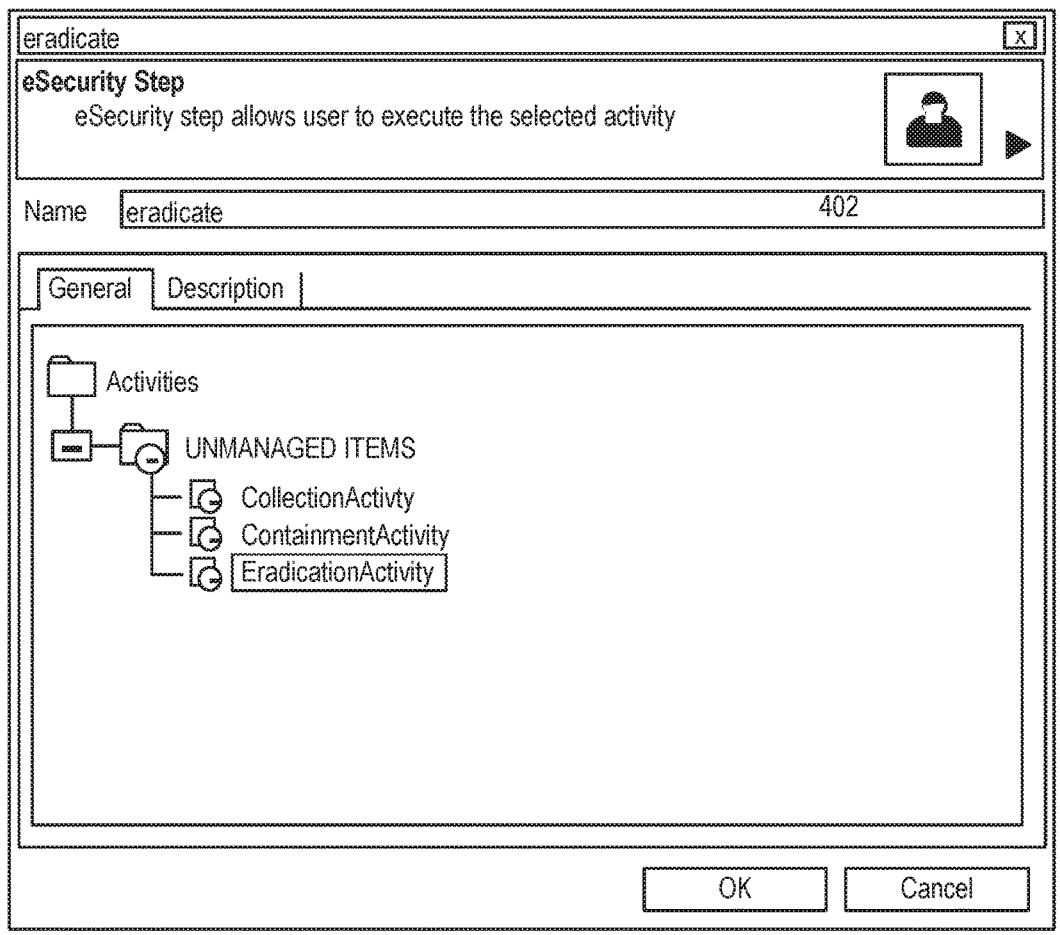
FIG. 5 is a template work-item configuration dialog box, according to an embodiment of the invention.
Figure 6:
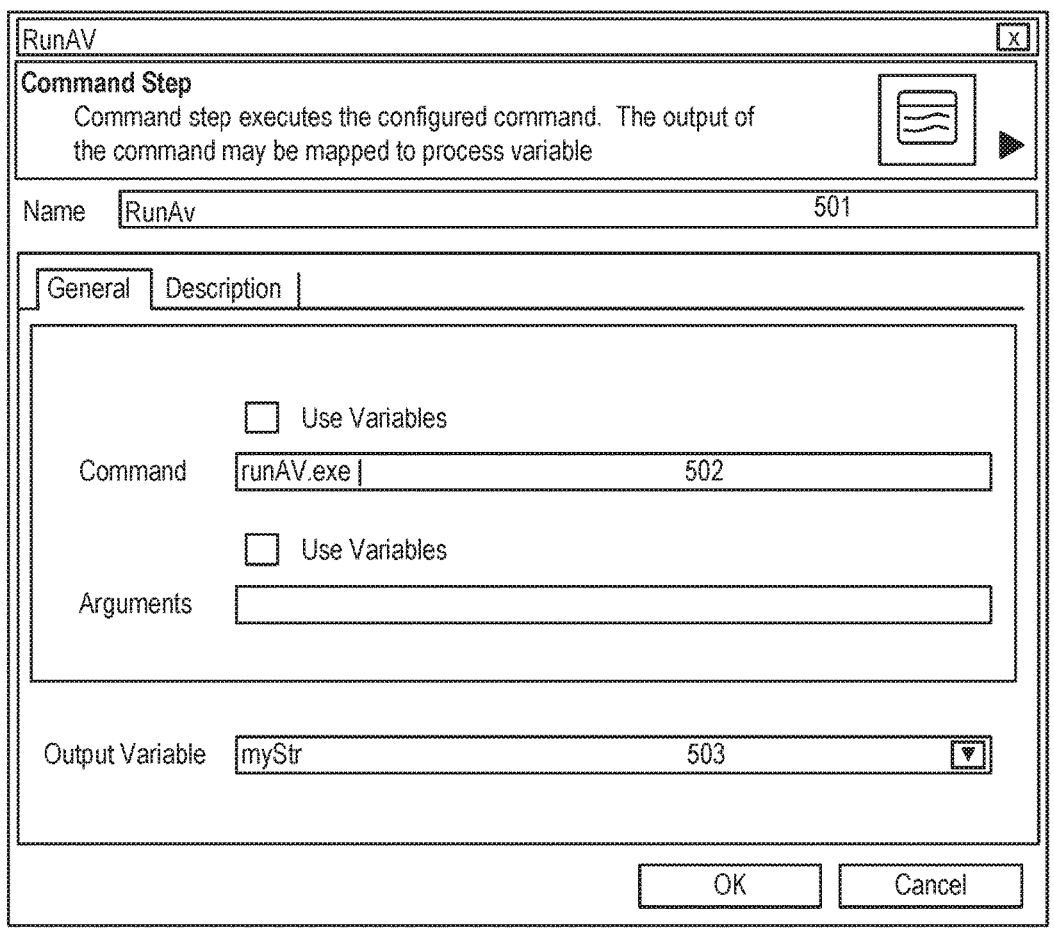
FIG. 6 is a command work-item configuration dialog box, according to an embodiment of the invention.

FIG. 5 depicts a dialog for a template work-item which may be a predefined work-item stored within the system. A user may select from a plurality of predefined work-items displayed in a window. The work-item may be named using a text box 402. The system work-items can be provided by a third party. Aspects of the template work-item may be configured. FIG. 6 illustrates a dialog for a command work-item. A command work-item may be added to execute a configured command that allows parameters to be passed into the command to be executed. The user may specify the command in a text box 502. The command name maybe specified in a separate text box 501. The command may be used to execute an action in an attempt to resolve at least a portion of the incident. For example, the command may be executed on a network device that may be causing the incident. The output of the command may be stored in a workflow process variable specified in a pull down menu 503. The output may indicate success or failure with respect to the executed command. In the possible event of failure, the workflow process may be designed to create another incident (sub-incident) in order to resolve the failed outcome before moving on to the next work-item.

An alert work-item may be used to send an email, instant message and/or other type of alert to an assigned user. The alert may be used to escalate a problem within the current workflow process instance or the alert may be sent as part of an audit trail. The user may configure various notification fields including From, To, Subject, and other fields.

A decision work-item is used to create a fork in the workflow process with the use of conditional transitions. A conditional transition can be created if the source work-item is a decision work-item. The output from a decision work-item may determine the next work-item of two or more work-items. A decisions work-item may also trigger a sub-incident as described above.

Transitions define flow of control within a workflow process instance between steps and/or work-items. A transition may include a source step or work-item and a destination step or work-item. Transition dialogs are used to configure transition attributes. Transition dialogs may support at least the attributes for name, icon, source step or work-item, and destination step or work-item. The source activity will be pre-populated by the step or work-item on which the transition is based. The different transition types may include unconditional transition, conditional transition, else transition, error transition, alert transition, timeout transition, and/or other transition types.

An unconditional transition may be a regular transition from a source activity to a destination activity. Conditional transitions are configured with conditional Boolean expressions using process variables. Conditional expressions can be created using a conditional expression builder. Conditional transition should be displayed if the source step or work-item is a decision step or work-item. There may be more than one conditional expression originating from a decision step or work-item. A conditional expression may be required for the conditional transition to be valid. An else transition is the "catch all" for decision steps or work-items, if all conditional transitions originating from a decision step or work-item fail, then the else transition is executed. Error transitions are exception transitions that are taken when a step or work-item executed by the system fails (template, command, alert, and decisions work-items).

An alert transition may be configured to send an alert message to a designated user address. A time out transition can send an alert to a user based on a time out defined by the user in minutes or other unit of time. As a result of the time out the source work-item may be removed from one user's work-list and placed into another user's work-list or the work-item may be shared between two or more users.

It should be appreciated that the system illustrated in FIG. 1 may be implemented at least in part to monitor system activity within a computer network. Network devices, security devices and security software may include firewalls, routers, web servers, databases, switches, mainframes, anti-virus software, and operating systems, among others. The information collected may be stored in a relational database (e.g., database 13) and may be used to report events to correlation engine 14. Activity monitor 12 may normalize security events into structured events (e.g., XML format with metadata) to allow for more uniformed analysis techniques. Security events may also be filtered based on pre-determined patterns so that events of the most interest are processed and/or stored. Although the figure illustrates a single activity monitor, it should be appreciated that a plurality of activity monitors may be distributed within in a network.

The network may include external and internal event sources. The collection of filtered events from the various sources may be passed to correlation engine 14 which analyzes event data. One or more events of interest passed to correlation engine 14 may undergo a correlation algorithm that computes correlation events by analyzing the data stream in real-time and determining whether an incoming event or series of events should be made into a correlation event. Correlated events may be published based on user defined correlation rules before the events get stored to a database 15 associated with correlation engine 14. Rules in correlation engine 14 can detect a pattern in a single event of interest or a running window of events. When a match to an existing correlation rule is detected, the correlations engine generates a correlated event describing the found pattern and may create an incident to trigger a remediation workflow. Although FIG. 1 illustrates a single correlation engine, it should be appreciated that a plurality of correlation engines may be distributed within in a network. In one embodiment, the operation of correlation engine 14 and the collection of events is described in co-pending U.S. patent application Ser. No. 10/975,374 filed Oct. 29, 2004, entitled "Computer-Implemented Method and system for Security Event Correlation" and in co-pending U.S. patent application Ser. No. 11/317,231 filed Dec. 27, 2005, entitled "Computer-Implemented Method and System for Security Event Transportation Using a Message Bus", both of which are assigned to the present assignee, and incorporated herein by reference.

Figure 7:
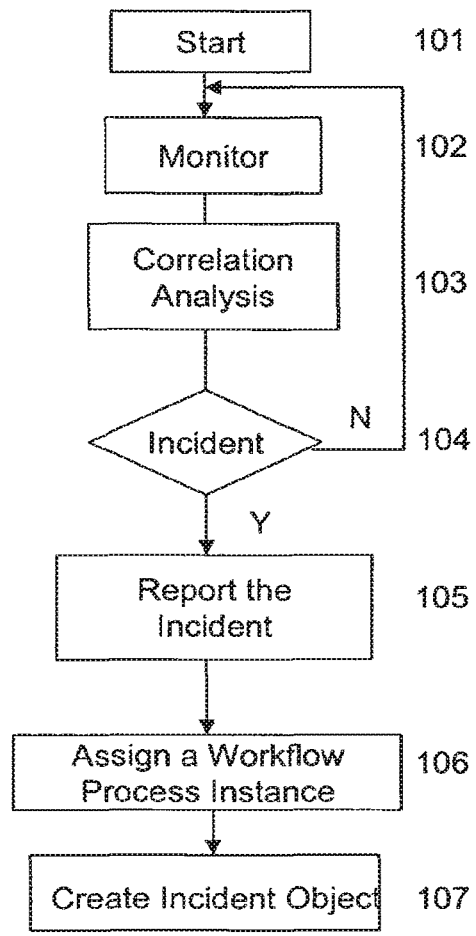
FIGS. 7 and 8 are flow charts that relates generally to an incident response method, according to an embodiment of the invention.

FIG. 7 is a flow chart that generally relates to the method performed by the invention, according to one embodiment. System events and particularly security events may be monitored and collected from various entities on the network (operation 102). In this operation, events may be normalized and further filtered based on user defined interests. Next, correlation analysis may be performed to determine the details with respect to an event or series of events (operation 103). A correlation algorithm and/or correlation rules may determine whether an incident has occurred (operation 104). If an incident is observed then an incident is reported (operation 105). If it is determined those events of interest do not correlate to an incident then the method returns to operation 102 and continues to monitor system events.

In order to remediate the incident the incident report triggers a workflow process instance to be assigned to the reported incident (operation 106). After the workflow process instance has been assigned to the incident, an incident object may be created to facilitate the remediation of the incident (operation 107).

Figure 8:
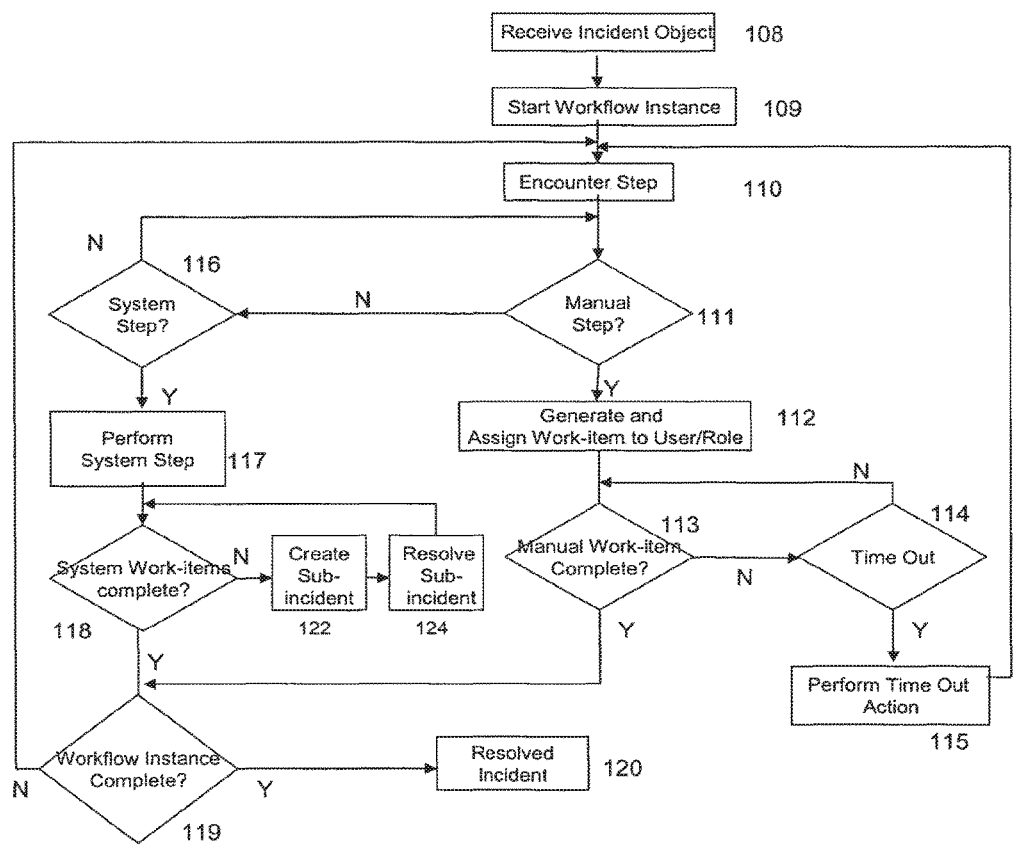

FIG. 8 describes the method for executing the workflow process instance of a received incident object. Upon receiving an incident object (operation 108), the workflow process instance from the object may begin execution (operation 109). As the workflow process instance is executed it may be determined for each step encountered (operation 110) along the workflow whether it is automatic step or manual step (operation 111 and 116). If an automatic step is defined then the system automatically performs the system step by performing the associated system work-items defined for the step. The step and work-item(s) are performed without need of any user intervention (operation 117 and 118). If, however, a manual step is defined, a user input may be required to complete it. A manual work item may be generated and assigned to a user and/or role based on work-item attributes or dynamic user/role selection (operation 112). The user/role assigned to the work-item (or another user) may perform the work required to complete the manual work-item (operation 113). A determination may be made as to whether the action is completed. If the action is not completed then a further determination may be made whether a time out has been reached (operation 114). If the time out has been reached then a defined timeout action may be performed (e.g., sending a notification to one or more other users of the system to take action). If no time out has been reached the process continues to operation 113.

If the step is a system step (e.g., executed via one or more computer applications) then the step may be performed accordingly (operation 117). It may be determined after the step is performed whether the associated work-items are completed successfully or not (operation 118). This determination may be based on output from the work-items. If the work-items are not successfully completed, then a sub-incident may be created in order to resolve the problem (operation 122 and 124). The workflow process may wait until the sub-incident is resolved before moving on to the next work-item.

After the work-item(s) for the step (manual work-item or system work-item) is successfully completed the operation goes to operation 119 to determine whether the workflow instance is complete. If complete, the incident may be marked as resolved (operation 120) or else the process continues to the next step to be processed (operation 110).

The foregoing presentation of the described embodiments is provided to enable any person skilled in the art to make or use the invention. Various modifications to these embodiments are possible, and the generic principles presented herein may be applied to other embodiments as well. For example, the invention may be implemented in part or in whole as a hard-wired circuit, as a circuit configuration fabricated into an application-specific integrated circuit, as a firmware program loaded into non-volatile storage or a software program loaded from or into a data storage medium as machine-readable code, such code being instructions executable by an array of logic elements such as a microprocessor or other digital signal processing unit, or may include other implementations.

Embodiments of the invention include a computer program containing one or more sequences of machine-readable instructions describing a method as disclosed above, or a data storage medium (e.g. semiconductor memory, magnetic or optical disk) having such a computer program stored therein. The invention is not intended to be limited to the embodiments provided above, but rather is to be accorded the widest scope consistent with the principles and novel features disclosed in any fashion herein. The scope of the invention is to be determined solely by the appended claims.

What is claimed is:

1. A method to create automated workflows for incident remediation, the method comprising:
    selecting, by a system configured to create automated workflows for incident remediation, two or more work-items of a plurality of work-items to include in a workflow process instance, where:
        the plurality of work-items comprise one or more system work-items that comprise one or more executable commands to be executed by one or more devices of a network, each system work-item of the one or more system work-items directed to remediating one or more incidents;
        the one or more incidents correspond to a set of correlation rules defining characteristics of one or more events, the one or more events corresponding to activity in the network specified based on a policy;
    creating, by the system, one or more transitions to include in the workflow process instance, each transition of the one or more transitions defining a decision process between at least two work-items of the two or more work-items selected;
    verifying, by the system, the workflow process instance as the two or more work-items and the one or more transitions are added to the workflow process instance;
    storing, by the system, the workflow process instance in a data store;
    monitoring, by the system, the network and detecting occurrence of the one or more incidents in the network;
    responsive to the detecting of the occurrence of the one or more incidents in the network, assigning, by the system, the workflow process instance to the one or more incidents detected, and initiating execution of the two or more work-items, where the initiating the execution comprises electronically communicating, via the network to one or more devices, the workflow process instance as a self-contained object to the one or more devices, causing the one or more devices to automatically execute the workflow process instance including the one or more system work-items;
    processing, by the system, a set of one or more communications received from the one or more devices, the set of one or more communications indicative of a status associated with the one or more system work-items; and
    based on processing the set of one or more communications received, tracking, by the system, remediation of the one or more incidents at least in part by tracking progress along a sequence in the workflow process instance.

2. The method of claim 1, further comprising:
    facilitating, by the system, a visual user interface providing one or more user-selectable options corresponding to at least one work-item of the plurality of work-items; and
    receiving, by the system, one or more user selections of the one or more user-selectable options;

wherein the selecting the two or more work-items to include in the workflow process instance is based on the one or more user selections.

3. The method of claim 2, further comprising:
outputting, by the system, information for display via the visual user interface to graphically represent the status associated with the one or more system work-items based on the workflow process instance.

4. The method of claim 3, wherein the verifying comprises detecting one or more errors in the workflow process instance as the workflow process instance is created, and the method further comprises:
outputting, by the system, one or more messages for display via the visual user interface to graphically represent the one or more errors detected.

5. The method of claim 4, wherein the one or more transitions are based on variables defined within the work-item, and the one or more transitions correspond to at least one unconditional transition, conditional transition, else transition, error transition, time out transition, or alert transition.

6. The method of claim 5, wherein the assigning comprises a workflow module automatically assigning the workflow process instance to the one or more incidents in response to determining that one or more workflow assignment rules indicate that the workflow process instance is specified to remediate incidents associated with the one or more events, one or more devices affected by the one or more incidents, or one or more devices that caused the one or more incidents.

7. The method of claim 6, wherein the one or more user-selectable options provided by the visual user interface facilitates editing of the workflow process instance based on a work-item palette that lists the plurality of work-items as selectable items that may be dragged and dropped from the work-item palette to a process graph to specify the two or more work-items for creation of the workflow process instance.

8. A system configured to create automated workflows for incident remediation, the system comprising:
one or more processors; and
a memory communicatively coupled with and readable by the one or more processors and having stored therein instructions which, when executed by the one or more processors, cause the one or more processors to perform:
selecting two or more work-items of a plurality of work-items to include in a workflow process instance, where:
the plurality of work-items comprise one or more system work-items that comprise one or more executable commands to be executed by one or more devices of a network, each system work-item of the one or more system work-items directed to remediating one or more incidents;
the one or more incidents correspond to a set of correlation rules defining characteristics of one or more events, the one or more events corresponding to activity in the network specified based on a policy;
creating one or more transitions to include in the workflow process instance, each transition of the one or more transitions defining a decision process between at least two work-items of the two or more work-items selected;
verifying the workflow process instance as the two or more work-items and the one or more transitions are added to the workflow process instance;
storing the workflow process instance in a data store;
monitoring the network and detecting occurrence of the one or more incidents in the network;
responsive to the detecting of the occurrence of the one or more incidents in the network, assigning the workflow process instance to the one or more incidents detected, and initiating execution of the two or more work-items, where the initiating the execution comprises electronically communicating, via the network to one or more devices, the workflow process instance as a self-contained object to the one or more devices, causing the one or more devices to automatically execute the workflow process instance including the one or more system work-items;
processing a set of one or more communications received from the one or more devices, the set of one or more communications indicative of a status associated with the one or more system work-items; and
based on processing the set of one or more communications received, tracking remediation of the one or more incidents at least in part by tracking progress along a sequence in the workflow process instance.

9. The system configured to create automated workflows for incident remediation of claim 8, the one or more processors further to perform:
facilitating a visual user interface providing one or more user-selectable options corresponding to at least one work-item of the plurality of work-items; and
receiving one or more user selections of the one or more user-selectable options;
wherein the selecting the two or more work-items to include in the workflow process instance is based on the one or more user selections.

10. The system configured to create automated workflows for incident remediation of claim 9, the one or more processors further to perform:
outputting information for display via the visual user interface to graphically represent the status associated with the one or more system work-items based on the workflow process instance.

11. The system configured to create automated workflows for incident remediation of claim 10, wherein the verifying comprises detecting one or more errors in the workflow process instance as the workflow process instance is created, and the one or more processors further to perform:
outputting one or more messages for display via the visual user interface to graphically represent the one or more errors detected.

12. The system configured to create automated workflows for incident remediation of claim 11, wherein the one or more transitions are based on variables defined within the work-item, and the one or more transitions correspond to at least one unconditional transition, conditional transition, else transition, error transition, time out transition, or alert transition.

13. The system configured to create automated workflows for incident remediation of claim 12, wherein the assigning comprises a workflow module automatically assigning the workflow process instance to the one or more incidents in response to determining that one or more workflow assignment rules indicate that the workflow process instance is specified to remediate incidents associated with the one or more events, one or more devices affected by the one or more incidents, or one or more devices that caused the one or more incidents.

14. The system configured to create automated workflows for incident remediation of claim 13, wherein the one or more user-selectable options provided by the visual user interface facilitates editing of the workflow process instance based on a work-item palette that lists the plurality of work-items as selectable items that may be dragged and dropped from the work-item palette to a process graph to specify the two or more work-items for creation of the workflow process instance.

15. One or more non-transitory, machine-readable media having machine-readable instructions thereon, which, when executed by one or more processing devices, cause the one or more processing devices to perform:
   selecting two or more work-items of a plurality of work-items to include in a workflow process instance, where:
      the plurality of work-items comprise one or more system work-items that comprise one or more executable commands to be executed by one or more devices of a network, each system work-item of the one or more system work-items directed to remediating one or more incidents;
      the one or more incidents correspond to a set of correlation rules defining characteristics of one or more events, the one or more events corresponding to activity in the network specified based on a policy;
   creating one or more transitions to include in the workflow process instance, each transition of the one or more transitions defining a decision process between at least two work-items of the two or more work-items selected;
   verifying the workflow process instance as the two or more work-items and the one or more transitions are added to the workflow process instance;
   storing the workflow process instance in a data store;
   monitoring the network and detecting occurrence of the one or more incidents in the network;
   responsive to the detecting of the occurrence of the one or more incidents in the network, assigning the workflow process instance to the one or more incidents detected, and initiating execution of the two or more work-items, where the initiating the execution comprises electronically communicating, via the network to one or more devices, the workflow process instance as a self-contained object to the one or more devices, causing the one or more devices to automatically execute the workflow process instance including the one or more system work-items;
   processing a set of one or more communications received from the one or more devices, the set of one or more communications indicative of a status associated with the one or more system work-items; and
   based on processing the set of one or more communications received, tracking remediation of the one or more incidents at least in part by tracking progress along a sequence in the workflow process instance.

16. The one or more non-transitory, machine-readable media of claim 15, wherein the machine-readable instructions further cause the one or more processing devices to perform:
   facilitating a visual user interface providing one or more user-selectable options corresponding to at least one work-item of the plurality of work-items; and
   receiving one or more user selections of the one or more user-selectable options;
   wherein the selecting the two or more work-items to include in the workflow process instance is based on the one or more user selections.

17. The one or more non-transitory, machine-readable media of claim 16, wherein the machine-readable instructions further cause the one or more processing devices to perform:
   outputting information for display via the visual user interface to graphically represent the status associated with the one or more system work-items based on the workflow process instance.

18. The one or more non-transitory, machine-readable media of claim 17, wherein the verifying comprises detecting one or more errors in the workflow process instance as the workflow process instance is created, and the machine-readable instructions further cause the one or more processing devices to perform:
   outputting one or more messages for display via the visual user interface to graphically represent the one or more errors detected.

19. The one or more non-transitory, machine-readable media of claim 18, wherein the one or more transitions are based on variables defined within the work-item, and the one or more transitions correspond to at least one unconditional transition, conditional transition, else transition, error transition, time out transition, or alert transition.

20. The one or more non-transitory, machine-readable media of claim 19, wherein the assigning comprises a workflow module automatically assigning the workflow process instance to the one or more incidents in response to determining that one or more workflow assignment rules indicate that the workflow process instance is specified to remediate incidents associated with the one or more events, one or more devices affected by the one or more incidents, or one or more devices that caused the one or more incidents.

* * * * *